2 Sheets—Sheet 1.

C. & E. VON CULIN.

INCUBATOR.

No. 11,194. Reissued Sept. 22, 1891.

Witnesses:
M. W. Hibshman
William J. Vail

Inventor.
Clayton Von Culin
Everett Von Culin

C. & E. VON CULIN.

INCUBATOR.

No. 11,194. Reissued Sept. 22, 1891.

Witnesses:
M. W. Hibshr.
William J. Vail

Inventor.
Clayton Von Culin
Everett Von Culin

UNITED STATES PATENT OFFICE.

CLAYTON VON CULIN AND EVERETT VON CULIN, OF DELAWARE CITY, DELAWARE.

INCUBATOR.

SPECIFICATION forming part of Reissued Letters Patent No. 11,194, dated September 22, 1891.

Original No. 446,090, dated February 10, 1891. Application for reissue filed August 15, 1891. Serial No. 402,762.

*To all whom it may concern:*

Be it known that we, CLAYTON VON CULIN and EVERETT VON CULIN, citizens of the United States of America, residing at Delaware City, in the county of New Castle and State of Delaware, have invented new and useful Improvements in Incubators, of which the following is a specification.

Our invention relates to improvements in incubators; and the novelty consists in the combination of the several parts as a whole, in which the temperature in the egg-chamber below the heater is controlled by means of a thermostat in the egg-chamber on a level with the eggs connected with and operating upon a valve or cover opening and closing a pipe or tube connected with and leading from a hot-air heater above the egg-chamber, causing hot air to escape from the heater and cold air to be drawn into the heater to reduce the temperature and causing hot air to enter the heater and stopping the entrance of cold air to raise the temperature, as the case may require.

The advantages of our invention are that an even temperature is maintained in the egg-chamber without introducing drafts into the egg-chamber, which cause too much evaporation of the contents of the eggs.

Our improvements insure a better hatch and healthier chickens. We attain these objects by the mechanism illustrated in the accompanying drawings, in which—

Figure 1:
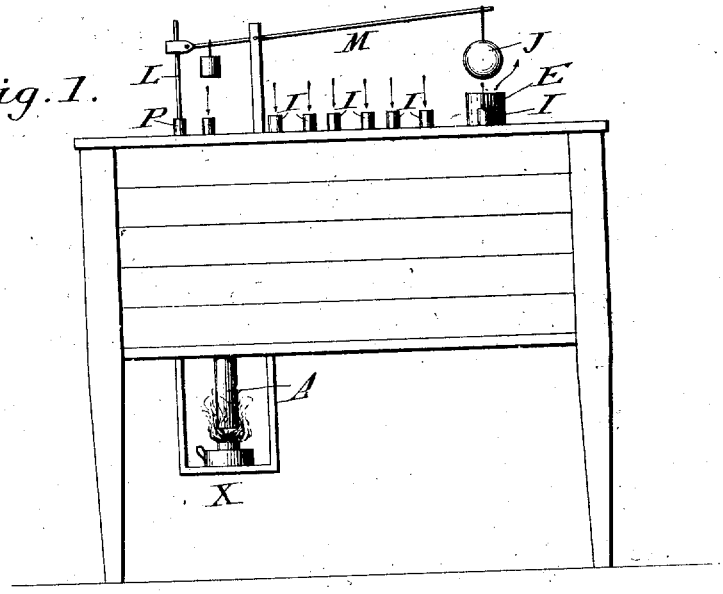
Figure 2:
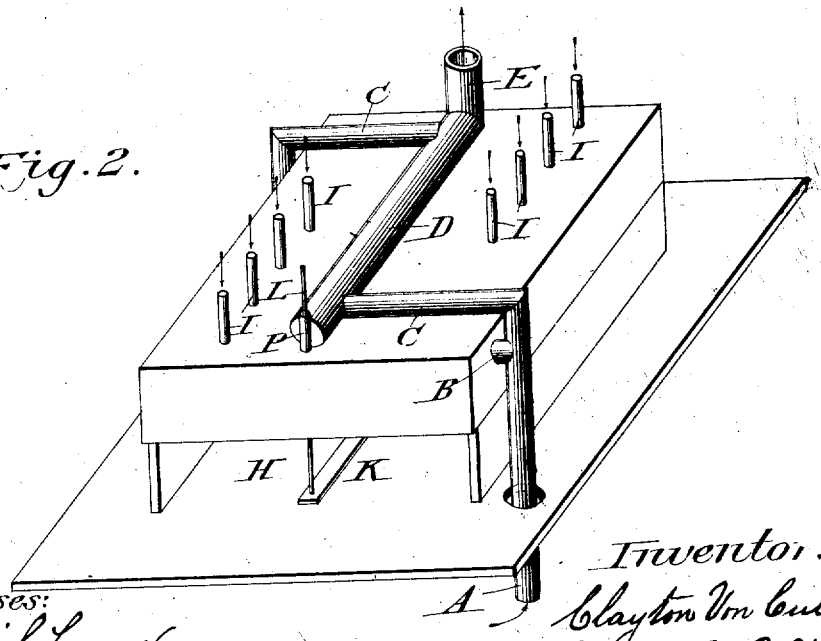
Figure 3:
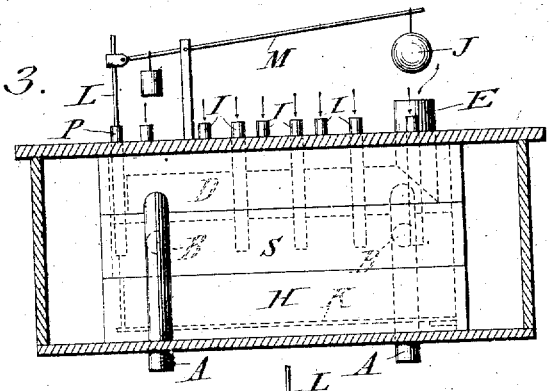
Figure 4:
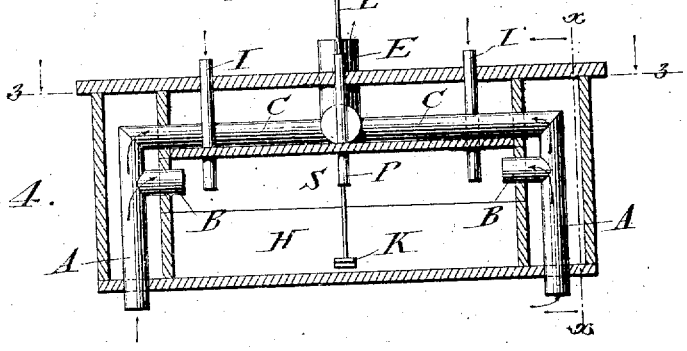
Figure 5:
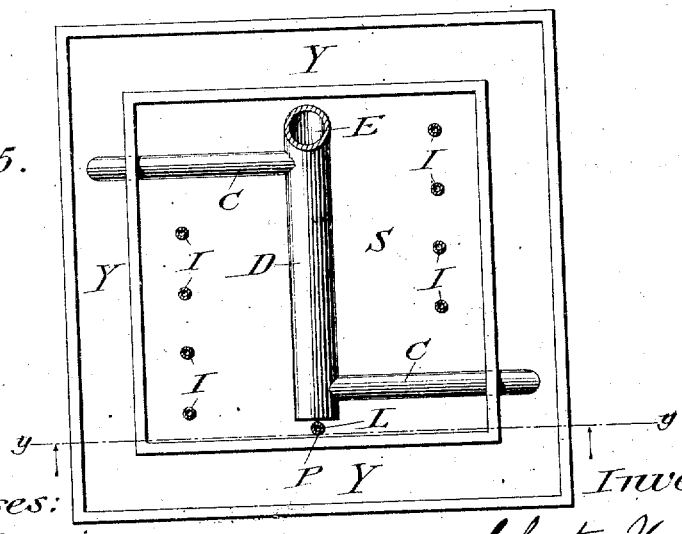

Figure 1 is a side elevation of the improved incubator, showing one of the lamps. Fig. 2 is a view in perspective, showing the body of the improved incubator with top and outer walls removed. Fig. 3 is a longitudinal section on line *x x* of Fig. 4 of the improved incubator, showing the thermostat and its connections. Fig. 4 is a view in cross-section on line *y y* of Fig. 5 of the improved incubator, showing the heater, egg-chamber, and hot and cold air pipes. Fig. 5 is a horizontal section on the line 3 3 in Fig. 4.

Similar letters refer to similar parts throughout the several views.

A A are inlets for conducting hot air into the heater S through pipes B B. When E is open, it allows the hot air to pass up A A and C C, through D, and out at E, making a draft which draws hot air out of the heater S at B B, at the same time drawing cold air into the heater S at I I I I.

D is a discharge-pipe of double the capacity of C, and carries off hot air from C C out at E when E is open.

E is the main outlet for hot air.

S is the hot-air heater five inches deep.

H is the egg-chamber.

I I I I are tubes running through the top of heater S, through which cold air is drawn into heater S when E is open.

K is a thermostat in the egg-chamber and is on a level with the eggs.

L is a metal rod connecting the thermostat with the lever M.

J is a ball or cover suspended at the outer end of the lever M, and is made to open or close the outlet E by action of the thermostat K.

P is a tube running from the egg-chamber H through the heater S, and through which the rod L passes. X is one of the lamps, two lamps being used at diagonally-opposite corners of the incubator.

Y Y Y Y is a five-inch space between the inner and outer walls of the improved incubator and is packed with mineral wool and granulated cork. All of the hot-air pipes are incased in asbestus or mineral wool.

We claim—

An incubator consisting of a hatching-chamber and a heater, hot-air pipes located at eccentrically-opposite corners of the incubator and having short pipes connecting them with the heater, a discharge-pipe to which the said hot-air pipes are connected and having an outlet, a valve controlling said outlet, a thermostat controlling said valve located on a level with the eggs in the hatching-chamber, and small tubes connecting the heater with the outer air, all substantially as and for the purpose set forth.

CLAYTON VON CULIN.
EVERETT VON CULIN.

Witnesses:
M. W. HIBSHMAN,
WILLIAM T. VAIL.